Figure 1:
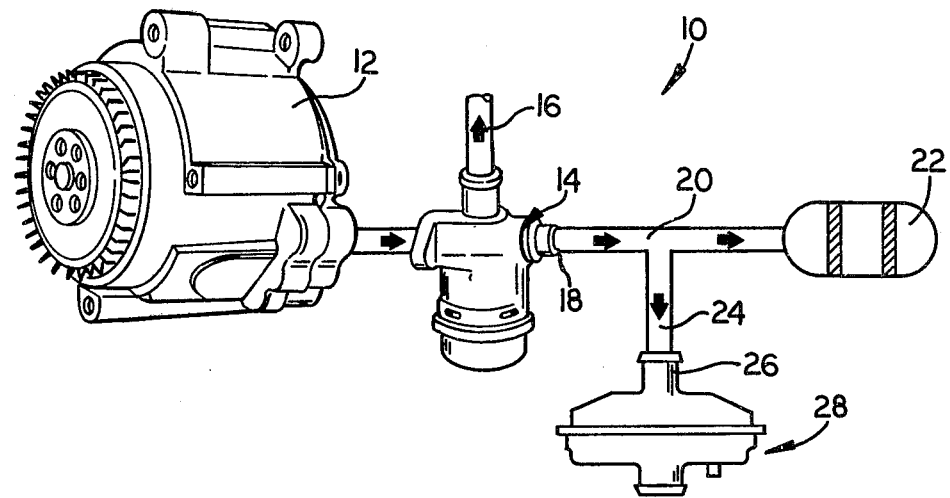

United States Patent [19]
Cook

[11] 4,345,428
[45] Aug. 24, 1982

[54] FLOW CONTROL VALVE FOR VEHICLE EMISSIONS CONTROL SYSTEM

[75] Inventor: John E. Cook, Chatham, Canada

[73] Assignee: Canadian Fram, Chatham, Canada

[21] Appl. No.: 208,614

[22] Filed: Nov. 20, 1980

[51] Int. Cl.[3] ............ F01N 3/22; F16K 13/06; F16K 17/40

[52] U.S. Cl. ............ 60/274; 60/289; 137/67; 137/517; 137/521

[58] Field of Search ............ 60/289, 307, 277, 290, 60/274; 137/67, 521, 517; 417/298, 299, 300, 557

[56] References Cited

U.S. PATENT DOCUMENTS

| | | | |
|---|---|---|---|
| 2,217,380 | 10/1940 | Pedder | 137/517 |
| 2,367,402 | 1/1945 | Kelly | 137/67 |
| 2,563,200 | 8/1951 | Venning | 137/521 |
| 2,899,981 | 8/1959 | Binks | 137/46 |
| 3,057,373 | 10/1962 | Bragg | 137/521 |
| 3,380,474 | 4/1968 | Mills | 137/521 |
| 3,523,559 | 8/1970 | Gibson | 137/517 |
| 3,586,018 | 6/1971 | Bogardh | 137/67 |
| 3,984,976 | 10/1976 | Nagai | 60/276 |
| 4,000,615 | 1/1977 | Bockelmann | 60/277 |
| 4,200,596 | 4/1980 | Iiyama | 137/67 |

*Primary Examiner*—Douglas Hart
*Attorney, Agent, or Firm*—Ken C. Decker; W. N. Antonis

[57] ABSTRACT

A vehicle emissions control system includes an air pump (12), a catalytic converter (22) communicated to the air pump, and a bleed control valve (28) which controls the quantity of air communicated from the air pump to the catalytic converter. The bleed valve includes a support arm (50) which suspends a valve element (40) adjacent a tapered valve surface (36). The support arm relaxes in response to repeated flexing due to the pulsating output of the air pump. Accordingly, when the vehicle is new, the valve element is held away from the valve seat to permit substantially uninhibited communication through the bleed valve so that almost all of the air which would otherwise be communicated to the catalytic converter is bled off. As the vehicle is used, the support arm relaxes, which permits the valve element to move progressively closer to the valve surface, thereby decreasing the quantity of air bled off through the bleed valve to thereby progressively increase the quantity of air communicated to the catalytic converter.

12 Claims, 2 Drawing Figures

FLOW CONTROL VALVE FOR VEHICLE EMISSIONS CONTROL SYSTEM

This invention relates to an emission control system for an automotive vehicle.

Automotive emissions control systems used on modern vehicles include a catalytic converter, an air pump having an outlet communicated with the catalytic converter to supply sufficient oxygen for the oxidation of the pollutants in the catalyst, and a diverter valve which switches the output of the air pump from the catalytic converter to another point in the vehicle emissions control system in response to varying engine operating parameters.

Such a prior art system is disclosed in U.S. Pat. No. 4,163,543, which describes in detail the switching valve used in such an emissions control system. However, it has been discovered that the oxygen requirements of the catalytic converter become greater as the vehicle is used. Since regulations require that the exhaust emission system of an automotive vehicle be warranted for 50,000 miles (80,000 km), the volume of air communicated to the catalytic converter must be changed as the vehicle is used since communication of too large a volume of air to a new catalyst tends to increase the rate of decay of the catalyst, and communication of an insufficient amount of air to a used catalyst will not permit the efficient oxidation of the vehicle emissions.

The device disclosed in the present application avoids the drawbacks of the prior art system because it permits the venting of excess air when the vehicle is new, and progressively reduces the quantity of air vented as the vehicle is used, so that the amount of air communicated to the catalyst is gradually increased as the vehicle is used.

According to another feature of the invention, a valve mechanism is communicated to the conduit between the outlet of the air pump and the catalytic converter. The valve mechanism includes a pair of valve elements, one of which is suspended on an arm which relaxes in response to the varying pressure drop across the valve mechanism caused by the pulsating output of the air pump. As the support member relaxes, the valve mechanism is gradually closed, thereby reducing the amount of air vented and increasing the amount of air communicated to the catalyst.

Accordingly, the present device has the advantage of optimizing the volume of air communicated to the catalytic converter on both new vehicles and older vehicles, without using complicated electronic controls or switches which respond to the vehicle odometer.

Figure 2:
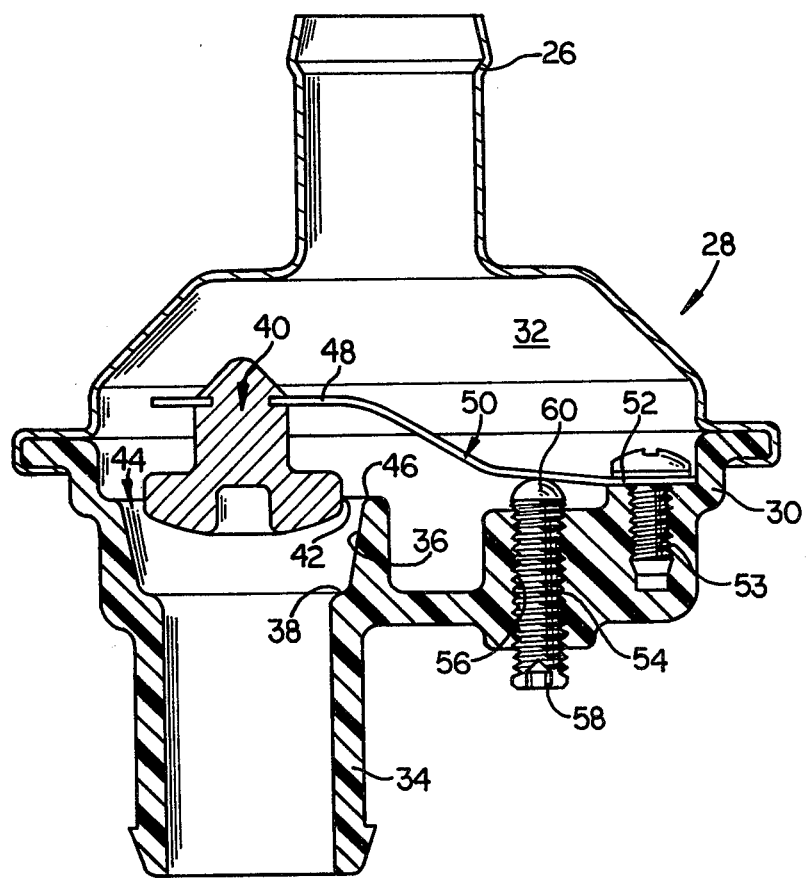

Other features and advantages will be apparent from the following description with reference to the accompanying drawings, in which:

FIG. 1 is a schematic illustration of an emission controls system made pursuant to the teachings of my present invention; and FIG. 2 is a cross-sectional view of a valve mechanism used in the system illustrated in FIG. 1.

Referring now to the drawings, an emission control system generally indicated by the numeral 10 includes an air pump 12. The air pump 12 is a conventional two-vane pump which generates a pulsating output and which is powered by the vehicle engine. In other words, the pressure level at the output of the air pump varies between maximum and minimum levels at a frequency of two times the speed of the pump. The outlet of the air pump 12 is communicated to a diverter valve 14, which may be of the type disclosed in my above-identified prior art U.S. Pat. No. 4,163,543. One outlet 16 is communicated to an upstream injection point (not shown) and the other outlet 18 of the valve 14 is communicated through conduit 20 to a conventional catalytic converter generally indicated by the numeral 22. The conduit 20 includes a branch 24 which is communicated to the inlet 26 of a flow control valve mechanism generally indicated by the numeral 28, which is more completely disclosed in FIG. 2.

Referring now to FIG. 2, the flow control valve 28 includes a housing 30 defining a cavity 32 therewithin which communicates with the branch 24 through the inlet 26. An outlet 34 communicates the cavity 32 with atmosphere or with the vehicle air cleaner, if it is necessary to prevent the air from being discharged directly to atmosphere. The outlet 34 extends into the cavity 32 and defines a tapering, conically shaped inner wall 36 and a seating area 38. Together, the conical wall 36 and seating area 38 define a valve seat which cooperates with a valve element generally indicated by the numeral 40 to control fluid communication through the outlet 34. The valve element 40 includes a circumferentially extending surface 42 which cooperates with the tapering conical surface 36 to define an orifice 44 therebetween. As can be seen from viewing FIG. 2, the size of the orifice 44 is progressively reduced as the valve element 40 is moved downwardly viewing FIG. 2 from the upper edge 46 of the surface 36 towards the valve seat 38. The valve element 40 is supported on one end 48 of a supporting arm 50. The other end of the supporting arm 50 is secured to the housing 28 through a fastener 53. An adjusting screw 54 is threadedly mounted in a bore 56 provided within the housing 30 and can be moved toward or away from the inlet 26 by manipulation of the end 58 of the screw 54 which projects from the housing 30. The other end 60 of the adjusting screw 54 engages the supporting arm 50, so that as the adjusting screw 54 is moved towards the inlet 26, the supporting arm 50 is moved upwardly viewing FIG. 2 to move the valve element 40 away from the seat 38. When the end 60 is moved away from the inlet 26, the valve element 40 is brought closer to the valve seat 38, thereby reducing the size of the orifice 44. The spring arm 50 is made from any suitable material, preferably a metallic material, and is subjected to flexing by pressure differentials between the inlet 26 and outlet 34 as will be hereinafter described. The material used for the arm 50 is chosen so that the repeated flexing of the arm 50 causes the material in the arm to relax in a manner well known to those skilled in the art. Relaxing of the arm 50 causes the valve element 40 to be moved progressively closer to the valve seat 38.

In operation, the various components of the flow control valve 28 are illustrated in FIG. 2 in the positions which they assume when the vehicle is relatively new. In this condition, the valve element 40 is held away from the valve seat 38 such that the size of the orifice 44 is relatively large. Accordingly, a calibrated restriction of the flow of air between the inlet 26 and outlet 34 will occur. This calibrated restriction will alow the excess air not required by a new catalytic converter to be bled off.

As discussed hereinabove, the air pump 12 is a two-vane pump of conventional design which generates a pulsating output. The pulsating output generated by the air pump 12 communicated through the conduit 20 and branch 24 causes the pressure drop across the valve 28 to fluctuate at a frequency of twice the speed of the pump. Since the valve element 40 is suspended in the flowpath between the input 26 and outlet 34 of the valve 28, the pressure fluctuations across the valve 28 cause the valve member 40, and therefore the support arm 50, to flex at the same frequency that the pressure drop across the valve 28 changes. Because of the flexing of the arm 50 caused by the forces applied to the valve member 40 by the pressure fluctuations across the valve 28, the arm 50 relaxes to move the valve element gradually downwardly viewing FIG. 2. Accordingly, as the arm 50 relaxes, the size of the orifice 44 is reduced because of the tapered portion 36, to thereby increase the restriction to fluid flow between the inlet 26 and outlet 34. Therefore, a progressively smaller amount of the air communicated through conduit 20 is bled off through the branch 24 as the valve member 40 moves closer to the valve seat 38. When the valve member 40 engages the valve seat 38, all communication to the branch 24 is shut off, and all of the fluid pressure output generated by the air pump 12 is communicated to the catalytic converter 22. As the size of the orifice 44 is decreased, progressively smaller quantities of the air communicated through the conduit 20 are bled off through the branch 24 so that the quantity of air communicated to the catalytic converter 22 is accordingly increased gradually.

I claim:

1. A method of controlling exhaust emissions in a motor vehicle having an exhaust system including a catalytic converter and a source of air pressure, comprising the steps of communicating the source of air pressure to the catalytic converter, venting at least a portion of the output generated by the source of air pressure when the vehicle is new, and progressively reducing the quantity of air vented as the vehicle is used to thereby progressively increase the quantity of air communicated to the catalytic converter.

2. The method of claim 1, wherein a conduit communicates the source of air pressure with the catalytic converter and air is vented from an opening in said conduit through a valve mechanism having a valve element and a valve seat, and the quantity of air vented is progressively reduced by moving the valve element progressively closer to the valve seat as the vehicle is used to thereby reduce the effective area of the flowpath through the valve mechanism.

3. The method of claim 2, wherein the valve element is suspended on a support member in the flowpath through the valve seat, and the valve element is moved closer to the valve seat by progressively relaxing the support member.

4. The method of claim 3, wherein the air pressure source produces a pulsating air output, and the support member is progressively relaxed by causing the pulsations produced by the air pressure source to flex the support member.

5. The method of claim 3, wherein the support member is progressively relaxed by causing changes in the pressure drop through said valve mechanism to flex said support member.

6. A vehicle emissions control system for a motor vehicle having a catalytic converter and a source of air pressure having an outlet communicated with said catalytic converter, characterized in that said system includes venting means for venting at least a portion of the output of the air pressure source when the vehicle is new, said venting means including means for reducing the quantity of air vented as the vehicle is used.

7. The emissions control system as claimed in claim 6, further characterized in that a conduit communicates the air pressure source with the catalytic converter, and said venting means communicates with an opening in said conduit.

8. The emissions control system as claimed in claim 7, further characterized in that said venting means includes a housing having an inlet communicated to said opening and an outlet communicated to atmosphere, and said means for reducing said quantity of air vented includes valve mechanism in said housing controlling communication between the inlet and outlet.

9. The emissions control system as claimed in claim 8, further characterized in that said valve mechanism includes a valve seat in the flowpath in the housing between the inlet and the outlet, a valve member cooperating with said valve seat to control communication therethrough.

10. The emissions control system as claimed in claim 9, further characterized in that said valve mechanism includes a support arm for suspending said valve member in said flowpath adjacent said valve seat.

11. The emissions control system as claimed in claim 10, further characterized in that said support arm has a pair of opposite ends, one of said ends being attached to said housing, said support arm projecting from said one end into said flowpath, the valve member being supported on the other end of said support arm, whereby said support arm is flexed by pressure changes in said flowpath so that the arm relaxes to permit said valve member to move closer to said valve seat.

12. The emissions control system as claimed in claim 11, further characterized in that said valve seat includes a tapered portion cooperating with a corresponding portion on said valve member to define an orifice therebetween, said arm relaxing to permit said valve member to move into said valve seat to progressively reduce the cross-sectional area of said orifice until said valve member engages the valve seat to close said orifice.

* * * * *